United States Patent Office 3,238,175
Patented Mar. 1, 1966

3,238,175
MOLDED ARTICLES OF SPENT OIL SHALE AND THERMOPLASTIC MATERIALS AND PROCESS FOR PREPARING SAME
John W. Marx and Harry W. Parker, Bartlesville, Okla., assignors to Phillips Petroleum Company, a corporation of Delaware
No Drawing. Filed July 22, 1960, Ser. No. 44,564
15 Claims. (Cl. 260—41)

This invention relates to molded articles of spent oil shale and thermoplastic materials and the process for preparing same. In one aspect the invention relates to molded articles prepared by intimately admixing spent oil shale and a polyolefin and molding said admixture at elevated temperatures and pressures.

There have been proposed numerous methods for preparing molded articles of thermoplastic materials using various naturally occuring materials as a binder by molding at elevated temperatures and/or pressures after suitable treatment of the naturally occurring material. Such naturally occurring materials include clay, pitch, Gilsonite, rock asphalt, peat, diatomaceous earth, oil shale and the like. In addition many synthetic materials have been developed to provide more desirable properties or more reproducible properties in the molded articles.

It has recently been proposed to produce molded articles by the combined action of heat and pressure on oil shales containing at least about 45 gallons of oil per ton of mineral. In our copending application Serial No. 862,034, filed December 28, 1959, we have proposed a method for molding articles from oil shales containing from 15 to 85 gallons of recoverable oil per ton of oil shale. In these utilizations of oil shale in conjunction with thermoplastic materials the oil shale contains significant quantities of oil which serves as a binder for the thermoplastic material.

In the treatment of oil shales for the recovery of the oil by the thermal cracking of the kerogen substantially all of the kerogen is decomposed and substantially all the recoverable oil is removed by distillation or retorting. This method of recovering oil has not proven economical in many sections of the world, particularly in this country, when compared to other methods of producing petroleum. One of the factors contributing to the economic deficiency of oil shale is the lack of utilization of the by products, such as the mineral matter remaining after retorting, commonly referred to as "spent oil shale." We have now discovered that this spent oil shale may be effectively utilized in conjunction with thermoplastic materials to form useful molded articles.

It is an object of this invention to provide moldable compositions comprising spent oil shale and thermoplastic materials.

Yet another object of this invention is to provide a moldable composition comprising a mixture of spent oil shale substantially kerogen free and oil-free.

Still another object of this invention is to provide a method for molding these compositions.

Other objects and advantages will be apparent to one skilled in the art upon study of this disclosure and the claims.

These objects are broadly accomplished by intimately admixing finely divided spent oil shale and a thermoplastic material and molding said composition at elevated temperatures and pressures. Surprisingly, we have found that admixtures of finely divided solid thermoplastic materials and finely divided spent oil shale are moldable by the method of this invention into articles having properties not possessed by articles molded from either of the molding components alone. These properties are further characterized in that the differences cannot be explained as a simple linear addition of the properties of materials making up the mixtures. Articles produced from the molding components of this invention display lasting beauty, good mechanical strength and high electrical resistivity as well as controlled characteristics of density and brittleness.

Oil shale can be defined broadly as a variety of compact sedimentary rock generally laminated that contains little or no oil but does contain organic material derived from aquatic organisms or waxy spores and pollen grains which is converted to oil by thermal cracking. Oil can be removed from natural bituminous rocks by extraction with an oil solvent but little or no oil can be extracted from oil shale in this manner. This pyrobituminous organic material in oil shale which forms oil by pyrolysis is called kerogen. Numerous heating processes and mechanical devices known as retorts have been developed for converting this kerogen into a recoverable oil. Some of these retorts are batch and some are continuous means. In one process the direction of shale flow may be down, in another it may be up and in still another it may be horizontal. These and many other features characterizing retort processes may be advantageous for one area and disadvantageous for another area because of differences in oil shales and the economics of the particular area or country attempting to extract the oil.

During retorting the kerogen is thermally cracked to produce shale oil which is removed from the shale by distillation or other suitable means leaving behind a rather brittle mineral matter commonly referred to as spent oil shale. This spent oil shale may contain some coke which may be burned with air to provide fuel for retorting in many processes leaving only mineral matter in the spent shale. It is this remaining spent shale absent any, or substantially any, kerogen or residual shale oil which is one of the components of this moldable composition. Although the presence of small quantities of kerogen and residual oil is not detrimental to this invention it has been found that this invention is operable when the spent oil shale is substantially kerogen-free and substantially shale oil-free, such as less than 1 gallon of shale oil per ton of spent oil shale.

The second component of the moldable composition of this invention is a thermoplastic material which serves as a binder for the spent shale. This thermoplastic material may be any thermoplastic material which when subjected to elevated temperatures and pressures will adhere with the spent shale to form a shaped article which will retain its shape upon subsequent cooling and depressurizing. Particularly useful thermoplastic materials are polyolefins and elastomeric materials such as rubber.

Peferred thermoplastic materials are any of the known polyolefins with those polyolefins produced according to the process disclosed in U.S. Patent No. 2,825,721 being preferred because of their high molecular weights and crystallinity. One satisfactory process for the preparation of these polyolefins comprises contacting ethylene or mixtures of ethylene with unsaturated hydrocarbons with a suspension of chromium oxide-containing catalyst in a liquid hydrocarbon diluent at a temperature such that substantially all of the polymer produced is insoluble in the diluent and is in solid particle form. The solid polyolefins applicable for use in this invention include those polyolefins prepared by the polymerization of olefins contains from 2 to 8 carbon atoms per molecule and having no branching nearer the double bond than the 4 position including but not limiting thereto, polyethylene, polypropylene, polybutylene and copolymers of ethylene and propylene and copolymers of ethylene and butylene.

A preferred polyolefin is polyethylene having a density from about 0.940 to 0.990 gm./cc., although polyethylene is utilizable with some sacrifice in surface hardness with some of the softer grades. In order to grind some of these softer polyolefins it is desirable to reduce the temperature of the polyolefins, such as by grinding with Dry Ice. Obviously, other refrigeration means are utilizable to embrittle the polyolefins.

The preparation of many moldable compositions comprising two dissimilar materials require intimate and thorough admixing of the components to form a substantially homogeneous composition so as to insure substantially uniform properties of the molded article. Generally, this intimate and thorough admixing is best accomplished if the components are crushed or ground to a very fine average particle size. It has been found that satisfactory moldable compositions are prepared by crushing or grinding spent oil shale to an average particle size of from about one-quarter inch to that which will pass through a 400 mesh screen or even less. The ground spent shale is then intimately admixed with a finely divided solid polyolefin having an average particle size comparable to that of the oil shale and the mixture is then subjected to heat and pressure to produce the desired shaped article. Obviously the particle size required depends to some extent upon the effectiveness of the thermoplastic material as a binder when subjected to the particular operating conditions imposed thereon. For instance, when using rubber as the thermoplastic material it has been found generally desirable to grind the spent shale to a finer consistency than that required when using a polyolefin as a thermoplastic material. It is preferable, when using rubber, that the spent shale be ground so as to pass substantially 100 percent of the spent shale through a 325 mesh screen. This particle size requirement also depends somewhat upon the amount of spent oil shale being incorporated into the rubber as well as the operating conditions for blending and molding.

The powdered or granulated blend is then placed in a closed mold or other suitable molding means and heated to a temperature sufficient to cause adherence of the spent oil shale to the thermoplastic material. For example, when the thermoplastic material is a polyolefin the temperature is preferably above the softening point but below the decomposition point of said polyolefin. For example, when the polyolefin is polyethylene having a density between about 0.940 to 0.990 gm./cc., the preferred temperature range is about 250° F. to 600° F., even more preferably in the range of about 260 to 400° F. The pressure during the molding step is preferably in the range of about 500 to about 20,000 p.s.i. or higher maintained for about one-half to about 10 minutes depending on the size of the article being molded. The mold is then cooled to a temperature below the deformation point before the pressure is released. The molding period is sufficient to plasticize the thermoplastic material and depends on the molding temperature and the size of the particles as well as the size of the article being molded. As used herein, deformation point refers to the temperature to which the article must be cooled to prevent the deformation of the thermoplastic material by the application of slight pressure. For instance, in the case of polyethylene having a density of about 0.940 gm./cc., the deformation point is essentially equivalent to the softening point.

While entirely satisfactory results are obtained by dry blending the two molding components, it is preferable to utilize procedures similar to those employed in the rubber industry, for example, milling or Banbury mixing to reduce the heterogenous admixture to a substantially homogeneous mixture. Extruders or extrusion rolls are then utilized to form the desired articles of manufacture from the moldable composition. Articles such as floor tile, siding, roofing, drain pipes, boxes, trays, toys, game devices, vases, lamps, pen bases and the like are example of products which are readily manufacturable from these materials by extrusion and molding methods. The hot sheeted material from the rolls or extruder can also be blown by positive or negative pressure into irregular shapes such as domes, cones, and the like. Slabs from the rolls and rods or tubes from the extruders can be utilized as such without being subjected to additional molding pressure.

Pigments and cover agents can be incorporated into the materials during the blending operations to form a wide spectrum of color ranging from light tan or buff through yellow, blue, green or maroon.

It has been found that the abrasion resistance, hardness and resistance to impact of these materials are superior to materials most commonly used in the fabrication of articles such as floor tile when materials, such as Dixie clay. The mechanical strength of the molded articles of this invention is at least as good as similar conventionally molded articles.

Although these solid thermoplastic materials are combined with the spent shale in an almost infinite variety of ratios, the preferred range is from about 5 to about 95 weight percent of thermoplastic material based on the total composition weight, preferably from about 10 to about 90 weight percent. As increase in the ratio of thermoplastic materials, such as polyethylene, to the spent oil shale generally decreases the hardness of the composition since the thermoplastic material is generally softer than the spent oil shale.

In some applications, it is desirable to add the thermoplastic material, such as polyethylene, in various shapes such as shreds, pellets, etc. in order to obtain mottled effects or to take advantage of the high tensile strength of the polyethylene in either one or random directions.

When the polyethylene and the oil shale are blended together in a roll mill or a mixer such as a Banbury mixer, it is not generally necessary to reduce the size of the polyethylene beyond that which results from ordinary methods of manufacture.

Density as used herein is determined by compression molding a slab of the polymer, cooling said molding at a temperature reduction rate of 15 to 20° F. per minute to room temperature, cutting a pea-sized specimen therefrom, and placing said specimen in a 50-ml. glass-stoppered graduate. Carbon tetrachloride and methyl cyclohexane are added to the graduate from burettes in proportion such that the specimen is suspended in the solution. During the addition of the liquids the graduate is shaken to secure thorough mixing. When the mixture just suspends the specimen, a portion of the liquid is transferred to a small test tube and placed on the platform of a Westphal balance and the glass bob lowered therein. With the temperature shown by the thermometer in the bob in the range 73 to 78° F., the balance is adjusted until the pointer is at zero. The value shown on the scale is taken as the specific gravity.

The following specific examples present data which illustrate and clarify the invention but should not be so interpreted as to restrict or limit the invention necessarily.

EXAMPLE I

Samples were dry blended utilizing various proportions of polyethylene and spent oil shale prepared by retorting Colorado oil shale originally containing 30 gallons of oil per ton of recoverable shale oil. The spent shale contained mineral matter as follows:

| | Percent |
|---|---|
| $SiO_2$ | 27.6 |
| Mineral $CO_2$ | 36.7 |
| $Fe_2O_3$ | 2.9 |
| $Al_2O_3$ | 7.7 |
| CaO | 13.9 |
| MgO | 5.9 |
| $SO_3$ | 1.4 |
| $Na_2O$ | 2.1 |
| $K_2O$ | 1.5 |
| | 99.7 |

The spent oil shale had been retorted to remove coke but a minor quantity of oil apparently remained in the spent shale since grinding the shale by a mortar produced some agglomeration.

The spent oil shale was then mixed with 40 to 100 mesh polyethylene prepared by the method of Hogan and Banks supra having a density of 0.960 gm./cc. and a low load melt index of 0.9.

For melt index, the method of ASTM D–1238–52T is used with five runs being run at 2-minutes intervals, averaging the five weights, discarding any values which deviate from the average by more than 5 weight percent, reaveraging and multiplying by 5 to obtain the amount of extrudate in 10 minutes. If the melt index is low, such as less than 1.0 the high load melt index may be obtained by ASTM D–1238–57T (procedure 5) using a weight of 21,600 grams.

Subsequent to thorough mixing these materials were then molded in a one and one-quarter inch cylindrical mold at a pressure of 5,000 p.s.i. for 2 minutes at a temperature in the range of 317° to 338° F. The mold was maintained in a closed position until the termination of the molding cycle after which it was cooled to below 248° F. and opened. The resulting samples were tan in color and reasonably homogeneous.

Immediately after removing from the mold the articles were cooled to abient temperature and the Shore "D" hardness was determined by the method of ASTM D–676–58T on the molded disc. The results for the various compositions are compared in Table I below.

Table I

| Weight Percent Polyethylene | Wt. Percent Spent Oil Shale | Shore "D" Hardness | |
|---|---|---|---|
| | | Initial | Final |
| 50 | 50 | 65 | 61 |
| 30 | 70 | 72 | 69 |
| 20 | 80 | 73 | 69 |

It is to be noted that the double set of figures for the Shore "D" hardness values in Table I varies somewhat for the instantaneous reading and the subsequent reading. A difference indicates a slight tendency for the molded articles to flow under pressure and demonstrates a lack of brittleness in the article and the ability of the article to absorb shocks. This property produces superior floor tile or wallboard.

It is to be further noted that the hardness increases with the proportion of spent oil shale in the composition.

EXAMPLE II

In this example, spent oil shale is compared to a common filler, Dixie clay, in a polyethylene having a density of 0.960 gm./cc. and a low load melt index of 0.9. The conditions were the same as in Example I except that the sample was molded at a maximum temperature of 320° F. with the exception of Examples 5 and 6 where the maximum temperature was 390° F. The total elapsed molding time, including cooling, was 20 minutes. The spent oil shale was identical to the spent oil shale used in Example I except that runs 4 and 5 used spent oil shale which did not appear to contain any remaining shale oil.

Table II

| Sample No. | Composition | | | Ball Height, Inches [1] | Shore "D" Hardness [2] | | | Sample Weight, gm. |
|---|---|---|---|---|---|---|---|---|
| | Wt. Percent Spent Oil Shale | Wt. Percent Dixie Clay [3] | Wt. Percent Polyethylene | | | | | |
| 1 | | 80 | 20 | 24 | 72–71 | 72–71 | 70–69 | 5 |
| 2 | 80 | | 20 | 52 | 72–70 | 72–71 | 70–69 | 5 |
| 3 | 80 | | 20 | 42 | | | | 5 |
| 4 | 80 | | 20 | 54 | 77–76 | 79–76 | 79–78 | 5 |
| 5 | 70 | | 30 | 48 | 80–79 | 79–78 | 80–79 | 5 |
| 6 | | 70 | 30 | 26 | 73–72 | 73–72 | 74–73 | 5 |

[1] A 26 gm. steel ball was dropped from heights increased 2″ at a time until the top surface of the disk broke. It was supported at the edge. The samples were 1¼″ dia. and ⅛″ thick.
[2] Determined by the method of ASTM D–676–58T.
[3] A kaolin mineral filler consisting primarily of hydrated silicates of aluminum.

It will be seen from the above data that the composition of this invention has considerably more impact resistance than molded compositions using standard materials.

While certain examples, structure, composition and process steps have been described for purposes of illustration, the invention is not limited to these. Variation and modification within the scope of the disclosure and the claims can readily be effected by those skilled in the art.

What we claim is:

1. A molding composition comprising a mixture of a normally solid polyolefin and a spent oil shale, said spent oil shale being substantially kerogen-free and containing less than one gallon of recoverable oil per ton of oil shale.

2. The composition of claim 1 wherein said material is polyethylene.

3. A molding composition comprising between about 5 and about 95 weight percent based on total composition weight of a polyolefin and spent oil shale, said shale being substantially kerogen-free and containing less than one gallon of recoverable oil per ton of oil shale.

4. The composition of claim 3 wherein said polyolefin is polyethylene having a density in the range of about 0.940 to about 0.990 gm./cc.

5. A molded article comprising a substantially homogeneous mixture of spent oil shale and a normally solid polyolefin prepared by molding said mixture at a temperature and pressure sufficient to bind the material with the spent shale.

6. The article of claim 5 wherein said material is polyethylene.

7. A molded article comprising a substantially homogeneous mixture of spent oil shale and a solid polyolefin, said shale being substantially kerogen-free and containing less than one gallon of recoverable oil per ton of spent oil shale, said article being prepared by molding an admixture of finely divided spent oil and finely divided solid polyelefin at a temperature above the softening point but below the decomposition point of said polyolefin at a pressure in the range of about 500 to about 20,000 p.s.i.

8. A molded article comprising a substantially homogeneous mixture of spent oil shale and between about 5 and about 95 weight percent based on total composition weight of a solid polyolefin, said shale being substantially kerogen-free and containing less than one gallon of oil recoverable by distillation per ton of spent oil shale, said article being prepared by molding an admixture of finely divided spent oil and finely divided solid polyolefin at a temperature above the softening point but below the decomposition point of said polyolefin at a pressure in the range of about 500 to about 20,000 p.s.i. for a period of time sufficient to bind the polyolefin to the spent oil shale and cooling said article to below the deformation point.

9. A molded article comprising a substantially homogeneous mixture of finely divided spent oil shale and between about 10 and about 90 weight percent based on total composition weight finely divided solid polyethylene having a density between 0.940 and 0.990 gm./cc., said shale being substantially kerogen-free and containing less than one gallon of oil recoverable by distillation per ton of spent oil shale, said article being prepared by molding said mixture at a temperature between about 250° F. and about 600° F. and a pressure in the range of about 500 to about 20,000 p.s.i. for a period of time in the range ½ to 10 minutes and cooling said mixture below the deformation point.

10. A process for making a molded article which comprises intimately admixing spent oil shale and a polyolefin, said shale being substantially kerogen-free and less than one gallon of recoverable oil per ton of oil shale, and subjecting said mixture to a molding pressure and temperature sufficient to bind the shale and material into a molded article.

11. The process of claim 10 wherein said material is polyethylene.

12. A process for making a molded article which comprises intimately admixing finely divided spent oil shale and finely divided solid polyolefin, said shale being substantially kerogen-free and containing less than one gallon of shale oil recoverable by distillation per ton of spent oil shale, subjecting said mixture to a temperature above the softening point but below the decomposition point of said polyolefin at a pressure in the range of 500 to 20,000 p.si. for a period of time sufficient to bind the polyolefin to the spent oil shale and cooling said article to below the deformation point.

13. A process for making a molded article which comprises intimately admixing finely divided spent oil shale and between about 10 and 90 weight percent based on total composition weight of a finely divided solid polyolefin, said shale being substantially kerogen-free and containing less than one gallon of oil recoverably by distillation per ton of shale, subjecting said mixture to a molding temperature above the softening point but below the decomposition point of said polyolefin at a pressure in the range of 500 to 20,000 p.s.i for a period of time in the range of between ½ and 10 minutes and cooling said mixture below the deformation point.

14. The process of claim 13 wherein said polyolefin is of polyethylene having a density between about 0.940 and 0.990 gm./cc.

15. The process of claim 14 wherein said molding temperature is between about 250 and 600° F. and said deformation point is about 250° F.

References Cited by the Examiner

UNITED STATES PATENTS

| | | | |
|---|---|---|---|
| 1,649,545 | 11/1927 | Renow | 106—284 |
| 2,475,699 | 7/1949 | Derksen | 260—28.5 |
| 2,517,014 | 8/1950 | Miller et al. | 260—41 |
| 2,900,269 | 8/1959 | Bauman et al. | 106—273 |

FOREIGN PATENTS

| | | |
|---|---|---|
| 167,201 | 3/1956 | Australia. |
| 105,831 | 5/1917 | Great Britain. |

MORRIS LIEBMAN, *Primary Examiner.*

DANIEL ARNOLD, LEON J. BERCOVITZ,
*Examiners.*